UNITED STATES PATENT OFFICE.

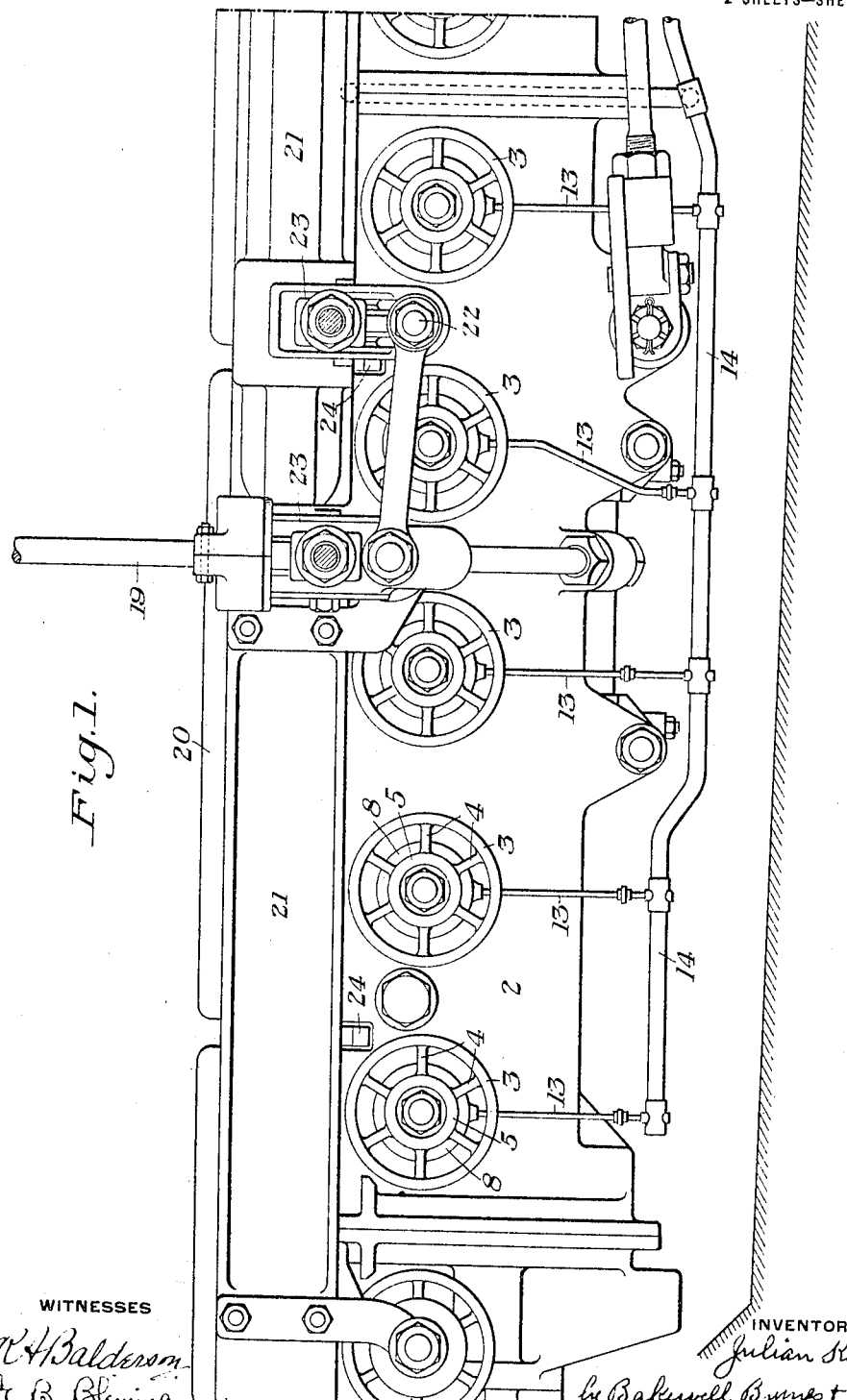

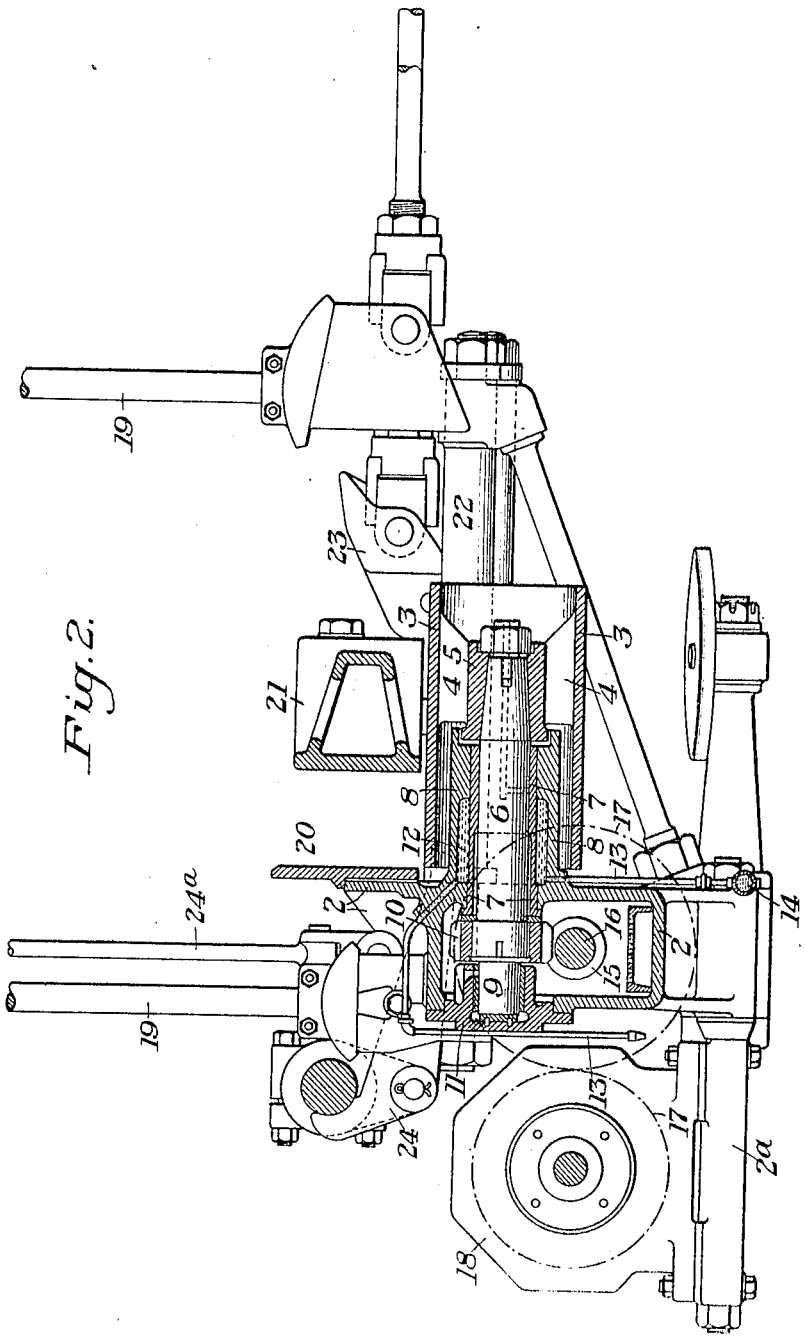

JULIAN KENNEDY, OF PITTSBURGH, PENNSYLVANIA.

TABLE MECHANISM FOR ROLLING-MILLS.

1,261,549.

Specification of Letters Patent.

Patented Apr. 2, 1918.

Original application filed April 21, 1916, Serial No. 92,614. Divided and this application filed August 24, 1917. Serial No. 187,956.

*To all whom it may concern:*

Be it known that I, JULIAN KENNEDY, a citizen of the United States, residing at Pittsburgh, in the county of Allegheny and State of Pennsylvania, have invented a new and useful Improvement in Table Mechanism for Rolling-Mills, of which the following is a full, clear, and exact description, reference being had to the accompanying drawings, forming part of this specification, in which—

Figure 1 is a side elevation of a portion of a rolling mill table embodying my invention; and Fig. 2 is a transverse section through the roll table, manipulator, guides, etc.

My invention relates to roll tables for rolling mills, and is designed to provide a novel means for mounting the table rolls and for cooling the bearings of the same. My invention is particularly applicable to roll tables which are adjustable transversely with respect to the mill rolls and in which relatively short table rolls are employed.

The present application is a division of my pending application, Serial No. 92,614, filed April 21, 1916.

Referring to the accompanying drawings, in which I have shown the preferred embodiment of my invention, the numeral 2 designates a table frame which may be, in general, of any suitable construction. 3 designates the table rolls which are of hollow form having the internal spiders 4, which carry the internal hub portion 5, which is rigidly secured to a rotary spindle 6. This spindle is overhung with respect to the frame 2, and has a long sleeve bearing 7, carried in an extension 8 of said frame. It also has an end bearing at 9 on the opposite side of its driving gear 10, and which is carried in a removable cap member 11, seated in the frame 2. The frame extension 8 is provided with a chamber or cavity 12, surrounding a portion of the sleeve bearing 7, and provided with circulating connections 13, from a pipe system 14, whereby water or other cooling fluid may be circulated through said chamber or space.

The spindles 6 may be driven in any suitable manner. On the drawings, I have shown the gears 10 as engaged by worm gears 15 on the shaft 16, connected by gears 17 with an electric motor 18. This motor is mounted on an extension 2ª of the frame 2, so as to be movable with the table, where my invention is employed in connection with a table which can be moved laterally or transversely with respect to the rolls. In the present instance, my invention is shown applied to a suspended table of the form more fully shown and described in my said application Serial No. 92,614, but is not limited to this particular form of table.

The numeral 19 designates suspension rods or links for the table. 20 designates a relatively fixed table guide movable with the table, and 21 is a guide which is movable relatively to the table and to the guide 20. 22 is a carriage member for the guide 21, and 23 designates actuating connections for said carriage member. 24 and 24ª designate manipulator mechanism. This manipulator mechanism as well as the guide mechanism forms no part of my present invention, but is fully described and claimed in other pending applications.

My invention provides a novel method of mounting and cooling the rolls of a roll table, the overhung shafts or spindles which carry the rolls being provided with efficient bearings and with means for cooling the same.

I do not desire to limit myself to the particular construction and arrangement of the various parts herein shown and described, as this may be varied in many ways without departing from the spirit and scope of my invention as defined in the appended claims.

I claim:

1. In a roll table having relatively short rolls, overhung spindles on which the rolls are mounted, and gearing for rotating the rolls, substantially as described.

2. A roll table having relatively short rolls, overhung spindles on which the rolls are mounted, gearing for rotating the rolls, and means for water-cooling the rolls, substantially as described.

3. A roll table having relatively short rolls, overhung spindles on which the rolls are mounted, gearing for rotating the rolls, and means for circulating a cooling fluid within said rolls and adjacent to the bearing of said spindles, substantially as described.

4. A roll table comprising a frame, said frame having laterally extending portions, bearing sleeves mounted in said portions, an overhung shaft or spindle journaled in each of said sleeves, and a hollow table roll having an internal hub secured to the projecting end of each shaft or spindle, substantially as described.

5. A roll table comprising a frame, said frame having laterally extending portions, bearing sleeves mounted in said portions, an overhung shaft or spindle journaled in each of said sleeves, and a hollow table roll having an internal hub secured to the projecting end of each shaft or spindle, the opposite end portion of each spindle having another bearing in said frame, substantially as described.

6. A roll table comprising a frame, said frame having laterally extending portions, bearing sleeves mounted in said portions, an overhung shaft or spindle journaled in each of said sleeves, and a hollow table roll having an internal hub secured to the projecting end of each shaft or spindle, the opposite end portion of each spindle having another bearing in said frame, and the spindle having a driving gear intermediate the two bearings, substantially as described.

7. A roll table comprising a frame having a lateral extension, an elongated bearing sleeve mounted in said extension, the extension having a space or chamber therein around said sleeve for the reception and circulation of cooling fluid, a shaft or spindle mounted in said sleeve and having a projecting end portion, and a table roll secured to said projecting end portion and surrounding said sleeve and extension, together with means for rotating the shaft or spindle, substantially as described.

8. A roll table having spindles, overhung bearings in which the spindles are journaled, and hollow table rolls secured to said spindles and telescoping rotatably over the overhung bearings, substantially as described.

9. A roll table having rotatable spindles, driving pinions secured to said spindles, bearings for the spindle located at opposite sides of said pinions, one of said bearings being overhung, and hollow table rolls secured to the spindles and telescoping rotatably over the overhung bearings, substantially as described.

In testimony whereof, I have hereunto set my hand.

JULIAN KENNEDY.

Copies of this patent may be obtained for five cents each, by addressing the "Commissioner of Patents, Washington, D. C."